US010907812B1

(12) United States Patent
Webb et al.

(10) Patent No.: US 10,907,812 B1
(45) Date of Patent: *Feb. 2, 2021

(54) ROTATING LIGHT TOWER ASSEMBLY

(71) Applicant: BOSS LTG, INC., Baton Rouge, LA (US)

(72) Inventors: George Webb, Baton Rouge, LA (US); Todd Chambers, Baton Rouge, LA (US)

(73) Assignee: BOSS LTG, INC., Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,082

(22) Filed: Aug. 27, 2019

Related U.S. Application Data

(63) Continuation-in-part of application No. 15/481,222, filed on Apr. 6, 2017, now Pat. No. 10,393,324.

(60) Provisional application No. 62/320,057, filed on Apr. 8, 2016.

(51) Int. Cl.
| *F21V 21/26* | (2006.01) |
| *F21V 25/00* | (2006.01) |
| *F21V 21/22* | (2006.01) |
| *F21V 21/15* | (2006.01) |

(52) U.S. Cl.
CPC .............. *F21V 21/26* (2013.01); *F21V 21/15* (2013.01); *F21V 21/22* (2013.01); *F21V 25/00* (2013.01)

(58) Field of Classification Search
CPC .......... F21V 21/26; F21V 21/15; F21V 21/22; F21V 25/00
See application file for complete search history.

(56) References Cited

U.S. PATENT DOCUMENTS

| 3,874,683 | A * | 4/1975 | Lawson | B62B 13/18 280/10 |
| 9,437,109 | B1 * | 9/2016 | Stafford | F21L 4/02 |
| 10,393,324 | B1 * | 8/2019 | Chambers | F21L 4/08 |
| 2001/0030683 | A1 * | 10/2001 | Howell | A61B 90/50 348/61 |
| 2010/0232148 | A1 * | 9/2010 | Sharpley | B62D 63/08 362/183 |
| 2016/0258601 | A1 * | 9/2016 | Gowanlock | F21V 21/22 |
| 2016/0309566 | A1 * | 10/2016 | Fletcher | B62D 49/08 |

* cited by examiner

*Primary Examiner* — Mary Ellen Bowman
(74) *Attorney, Agent, or Firm* — Roy Kiesel Ford Doody & North, APLC

(57) ABSTRACT

A light tower assembly configured to rotate a light section from a first to a second position. In various embodiments, the light tower assembly comprises (a) a primary boom extending vertically from a base, (b) a light array boom supporting a light section on a frame rotatively mounted to the primary boom wherein the light array boom rotates around an axis of rotation, (c) a mounting assembly rotatively mounting the light array boom to the primary boom, and (d) a linear actuator assembly connected to the primary boom and the light array boom being configured to rotate the light array boom in one direction when the linear actuator extends and configured to rotate the light array boom in an opposite direction when the linear actuator assembly retracts.

17 Claims, 11 Drawing Sheets

ROTATING LIGHT TOWER ASSEMBLY

CROSS REFERENCE TO RELATED APPLICATION

This application claims the benefit of U.S. patent application Ser. No. 15/481,222, filed Apr. 6, 2017 issuing as patent Ser. No. 10/393,324 on Aug. 27, 2019, which in turn claims the benefit of U.S. Provisional Application No. 62/320,057, filed Apr. 8, 2016, each of which are hereby incorporated by reference in its entirety.

BACKGROUND OF THE INVENTION

Field of Invention

Various embodiments relate to light towers or mobile lighting apparatus supporting a light array for the illumination of focal or desired locations

Prior Art

Light towers, mobile or stationary, used to support light assemblies for illumination purposes are well known in the prior art, but generally include a base, a boom, and a light section. Mobile light towers are deployed proximate the location to be illuminated and positioned to direct the light assembly towards the location desired to be illuminated. Safety concerns require that some mobile light towers be lowered to a mobile or storage configuration before the base is moved or repositioned. Thus, some mobile light towers must be lowered to a mobile configuration, the base repositioned, and the light tower subsequently erected again over the new location. However, it may be desired to illuminate a second location relatively adjacent to the first without having to lower, move and erect the mobile light tower. Regarding stationary light towers, similar desires exists to illuminate a second location relatively adjacent to the first. Methods exist for rotating the light section. However, these are often structurally limiting. Therefore, there is a need in the art to develop a method and apparatus to rotate a light array without repositioning the base or rotating the light tower. Further, there is a need in the art to apply such a method and apparatus to preexisting light towers.

SUMMARY OF THE INVENTION

The present disclosure pertains to a light tower assembly configured to rotate a light section from a first position to a second position. In various embodiments, the light tower assembly includes (a) a primary boom extending vertically from a base; (b) a light array boom supporting a light section on a frame rotatively mounted to the primary boom wherein the light array boom rotates around an axis of rotation; (c) a mounting assembly rotatively mounting the light array boom to the primary boom; and (d) a linear actuator assembly connected to the primary boom and the light array boom being configured to rotate the light array boom in one direction when the linear actuator extends and configured to rotate the light array boom in an opposite direction when the linear actuator assembly retracts. In various embodiments, the light tower assembly further comprises and (e) a means of producing power and transferring power to operate the light tower assembly.

DETAILED DESCRIPTION OF THE DRAWINGS

Figure 1:
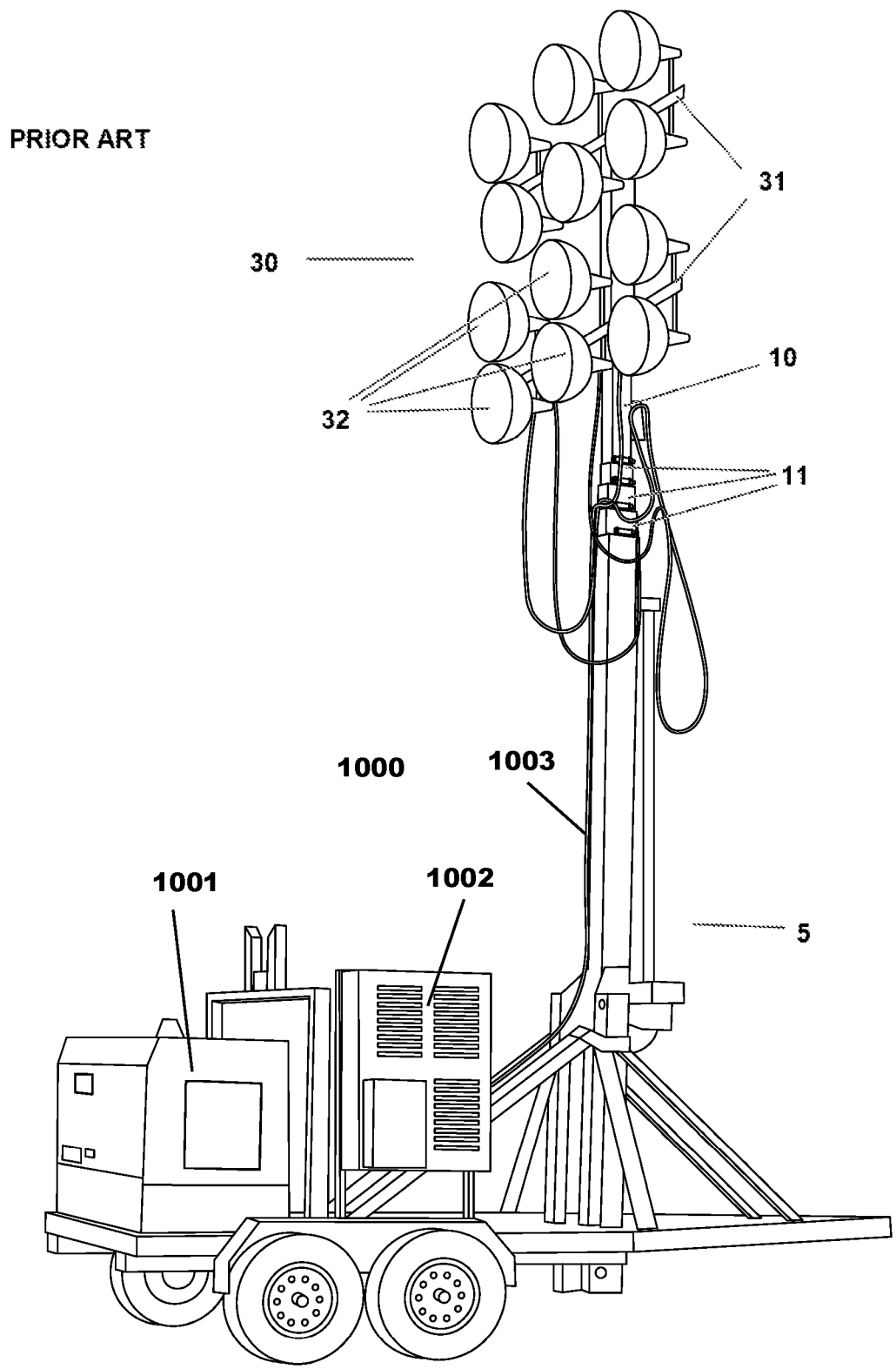
FIG. 1 is a view of the prior art showing a light section mounted to a primary boom, which is extending vertically from a base.

FIG. 1 is a view of a prior art light tower assembly 1. The primary boom 10 is extending substantially vertically from a base 5. A light section 30 having a fixture 31 and a plurality of lights 32 is mounted to the primary boom 10. As disclosed in U.S. patent Ser. No. 10/393,324, which is hereinafter incorporated by reference, light tower assembly may further include, but not necessarily shown in FIG. 1, (i) a tower post pivotally mounting the primary boom 10 to the base 5, (ii) a pivot controller affixed to the base 5 and operatively attached to the primary boom 10, the pivot controller when activated causing the primary boom 10 to be raised to a vertical position, (iii) a pivot winch or hydraulic pivot cylinder operatively responsive to the pivot controller to pivot the primary boom 10, (iv) a safety means to control the movement of the primary boom 10 as it is pivoted into a vertical position, (v) an extension boom 11 extendably and retractably connecting the primary boom 10 to the base 5, (vi) a telescoping controller affixed to the base 5 and operatively attached to the extension boom 11, the telescoping controller when activated causes the extension boom 11 to extend from the primary boom 10 relative to the base 5, (vii) a telescoping winch or telescoping hydraulic cylinder operatively responsive to the telescoping controller to extend the extension boom 11, and (viii) a power assembly 1000 operatively connected to the plurality of lights 32, the power assembly including a power supply 1001, an electrical connection box 1002, and a power cable 1003 operatively connected to the plurality of lights 32, the pivot winch or hydraulic pivot cylinder, and the telescoping winch or telescoping hydraulic cylinder.

Figure 2:
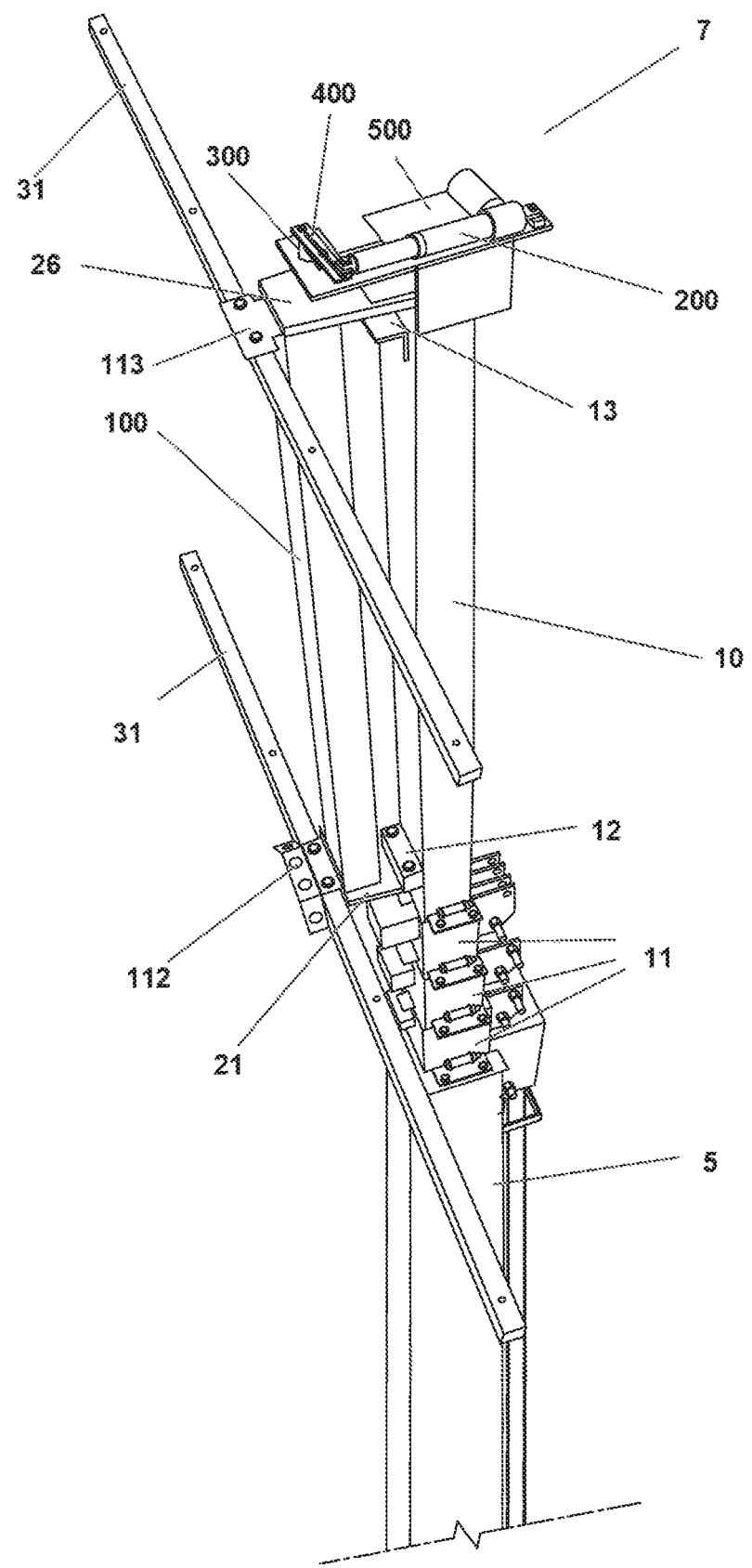
FIG. 2 a view of one of various embodiments of the light tower assembly of the claimed invention showing the light section, with the plurality of lights removed to illustrate the parts, rotatively mounted to the primary boom via the light array boom.

FIG. 2 is a view of one of various embodiments of the light tower assembly of the claimed invention. The primary boom 10 is extending substantially vertically from a base 5, not shown. A light array boom 100 having a frame 110 is rotatively mounted to the primary boom 10 wherein the light array boom 100 rotates around an axis of rotation 101. A mounting assembly 20 rotatively mounts the light array boom 100 to the primary boom 10. A light section 30 is removably connected to the light array boom 100. For purposes of clarity to illustrate the invention, the plurality of lights 32 have been removed from the figure.

A linear actuator assembly 7 is connected to the primary boom 10 and operatively connected to the light array boom 100. The linear actuator assembly 7 is configured to rotate the light array boom 100 in one direction when the linear actuator assembly 7 extends. The linear actuator assembly 7 is also configured to rotate the light array boom 100 in an opposite direction when the linear actuator assembly 7 retracts. In addition to being operatively connected to the plurality of lights 32, power assembly 1000 is further operatively connected to the linear actuator assembly. However, for purposes of clarity to illustrate the invention, power assembly 1000 and more specifically power cable 1003 has been removed from the figure.

Figure 3:
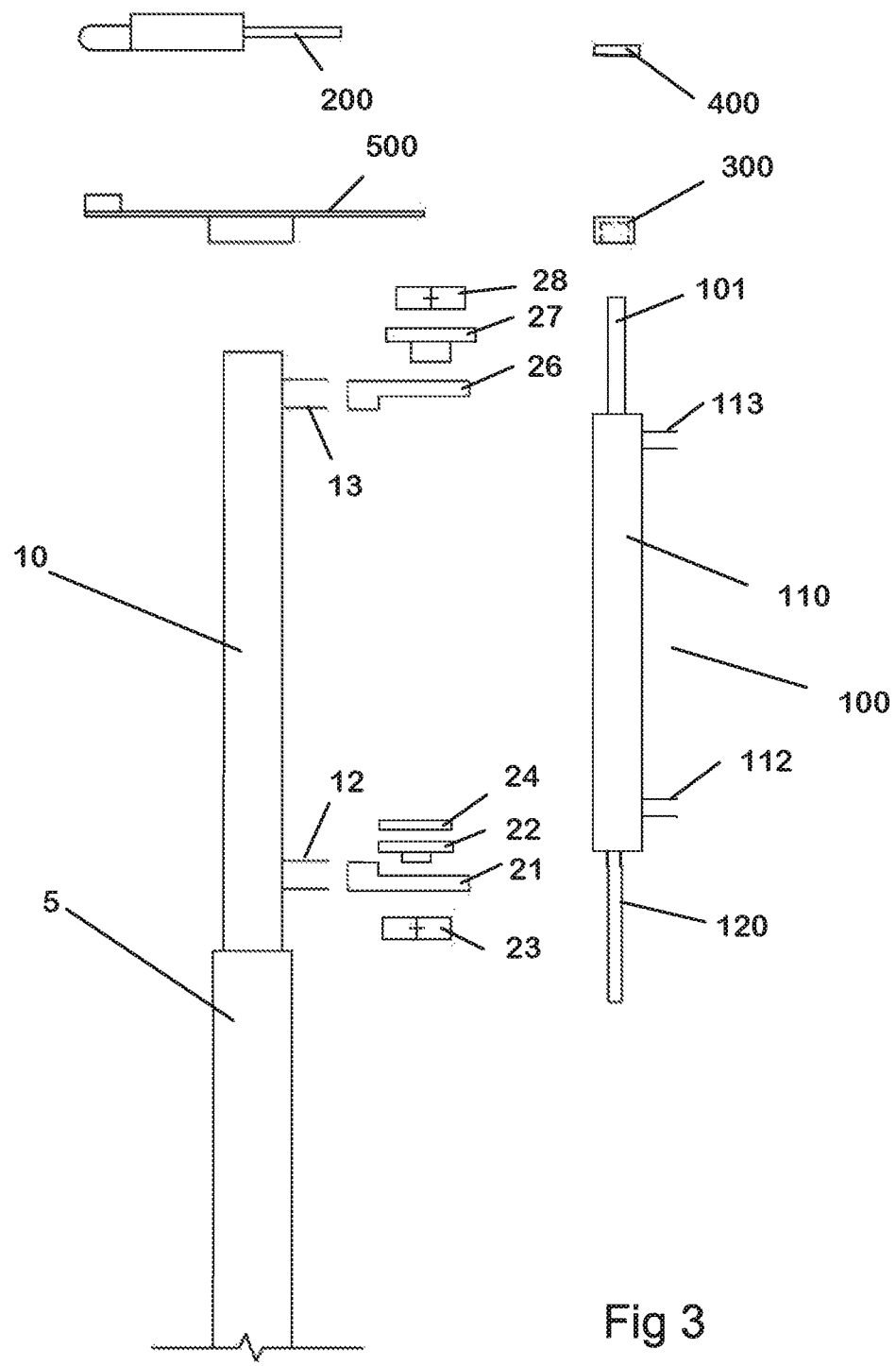
FIG. 3 is an exploded view of the light tower assembly of FIG. 2, illustrating the mounting assembly.

FIG. 3 is an exploded view of the light tower assembly 1 show in FIG. 2, including the primary boom 10, the light array boom 100, the mounting assembly 20, and the linear actuator assembly 7. In various embodiments, the light array boom 100 is rotatively mounted to the primary boom 10 wherein the light array boom 100 rotates around the axis of rotation 101. In various embodiments, the axis of rotation 101 is the geometric longitudinal axis of the frame 110 of the light array boom 100. In various embodiments, the light array boom 100 further comprises a longitudinal axle 120 connected to the frame 110 that is collinear with the axis of rotation 101 of the frame 110.

In various embodiments, the mounting assembly 20 rotatively mounts the light array boom 100 to the primary boom 10. In various embodiments, the mounting assembly 20 comprises a first mounting plate 21 removably connected to the primary boom 10 at a first end of the first mounting plate 21. In various embodiments, the mounting assembly 20 comprises a second mounting plate 26 removably connected to the primary boom 10 at a first end of the second mounting plate 26.

In various embodiments, the light array boom 100 is rotatively mounted to rotate around an axis of rotation 101, the weight of the light array boom 100 resting on a second end of the first mounting plate 21. In various embodiments, a bore passes through the second end of the first mounting plate 21. In various embodiments, the mounting assembly 20 further comprises a first flange bushing 22 having an axle bore passing through a top and a bottom, the bottom of the first flange bushing 22 positioned concentric with the bore of the first mounting plate 21. In various embodiments, the first mounting assembly 20 further comprises a thrust washer 24, also having an axle bore, and being positioned concentric with the first flange bushing 22 and concentric with the bore of the first mounting plate 22 wherein the first flange bushing 22 is between thrust washer 24 and the first mounting plate 21. In various embodiments, the light array boom 100 is rotatively mounted to rotate around an axis of rotation 101, the weight of the light array boom 100 being supported by the thrust washer 24. In various embodiments, the frame 110 of the light array boom 100 rotatively mounted to rotate around an axis of rotation 101. In various embodiments, thrust washer is a thrust bearing.

In various embodiments, the longitudinal axle 120 passes through the axle bore of the thrust washer 24. In various embodiments, the longitudinal axle 120 passes through the axle bore of the first flange bushing 22. In various embodiments, the longitudinal axle 120 passes through the bore of the first mounting plate 21. In various embodiments, a first shaft collar 23 secures frame 110 to the first mounting plate 21.

In various embodiments, the light array boom 100 is rotatively supported to rotate around an axis of rotation 101, the weight of the light array boom 100 stabilized by the second end of the second mounting plate 26. In various embodiments, a bore passes through the second end of the second mounting plate 26. In various embodiments, the mounting assembly 20 further comprises a second flange bushing 27 having an axle bore passing through a top and a bottom, the bottom of the second flange bushing 27 positioned within the bore or the second mounting plate 26.

In various embodiments, the longitudinal axle 120 passes through the bore of the second mounting plate 26. In various embodiments, the longitudinal axle 120 passes through the axle bore of the second flange bushing 27. In various embodiments, a second shaft collar 28 secures frame 110 to the second flange bushing 27.

It should be understood from the prior art that several methods exist to connect a primary boom 10 to a light section 30. In various embodiments, primary boom 10 further comprises a first and second mounting bracket 12, 13 to removably connect the first ends of the first and second mounting plates 21, 26. In various embodiments, light array boom 100 further comprises first and second mounting brackets 112, 113 to removably connect the light section 30 to the light array boom 100. In various embodiments, brackets 12, 13 and brackets 112, 113 are similar such that the same light section 30 may be removably connected to both the primary boom 10 and the light array boom 100. In various embodiments, brackets 12, 13 and brackets 112, 113 are not similar such that the light section 30 may be removably connected to the light array boom 100.

The linear actuator assembly 7 controllably transfers linear motion into rotational motion. In various embodiments, a power assembly 1000 is operatively connected to the linear actuator assembly 7 to power the extension and retraction of the linear actuator assembly 7. In various embodiments of the invention, linear actuator assembly 7 has a predetermined operating range of degrees through which it may rotate, or a range of rotation.

It should be understood that the range of rotation is limited by at least two factors. The first limit to the range of rotation is the configuration of a linear actuator assembly to rotate. Various linear actuator assemblies 7, 1007, 2007, 3007 can achieve various ranges of rotation. For example, the linear actuator assembly 7 may bind if configured to go beyond a certain threshold. However, the linear actuator assembly 3007 may not be limited by such a threshold. The second limit to the range of rotation is the configuration of the light array boom 100 and light section 30 with respect to the primary boom 10. In a various embodiments, light array boom 100 is rotatively mounted to the side of the primary boom 10, wherein dimensions of light array boom 100 or light section 30 may prevent the light array boom 100 or the light section 30 from freely rotating 360 degrees. In a various embodiments, the light array boom 100 is rotatively mounted onto the top of the primary boom 10, wherein dimension of the light array boom or the light assembly does not prevent the light array boom from freely rotating 360 degrees.

In various embodiments, the linear actuator assembly 7, 1007, 2007, 3007 has a neutral configuration wherein the light array boom 100 may rotate in an equal number of degrees in either direction. In various embodiments, the linear actuator assembly 7, 1007, 2007, 3007 has an extended configuration wherein the light array boom 100 has rotated to a maximum positive degree of rotation from a neutral configuration. In various embodiments, the linear actuator assembly 7, 1007, 2007, 3007 has a retracted configuration wherein the light array boom 100 has rotated to a maximum negative degree of rotation from a neutral configuration. In various embodiments, linear actuator assembly 7, 1007, 2007, 3007 has a plurality of configurations between the extended and retracted configuration. In various embodiments, light array boom 100 may be rotated to a plurality of degrees between a maximum positive degree of rotation to a maximum negative degree of rotation.

The linear actuator assembly 7 controllably transfers linear motion into rotational motion. Various methods of transferring linear motion into rotational motion are well known in the prior art. Various embodiments are disclosed to transfer linear motion into rotational motion. It should be understood that these disclosures are not exhaustive, but representative of art in transferring linear motion to rotational motion. Further, embodiments disclosed present a configuration wherein the linear actuator assembly 7, 1007, 2007, 3007 is located at the top of the primary boom 10 when in an operating position. It should be understood that the linear actuator assembly 7, 1007, 2007, 3007 can be located at any stationary position, stationary meaning with respect to the rotational motion of the light array boom 100. Further, embodiments disclosed present a configuration wherein the linear actuator assembly 30 acts on the top of the light array boom 100. It should be understood that the linear actuator assembly 30 can act on any portion of the light array boom 100. Further, embodiments disclosed position the light array boom 100 adjacent and parallel to the primary boom 10. It should be understood that the light array boom 100 can be positioned adjacent but not parallel to the primary boom 10. It should also be understood that the light array boom can be positioned adjacent and collinear to the primary boom 10.

Figure 4:
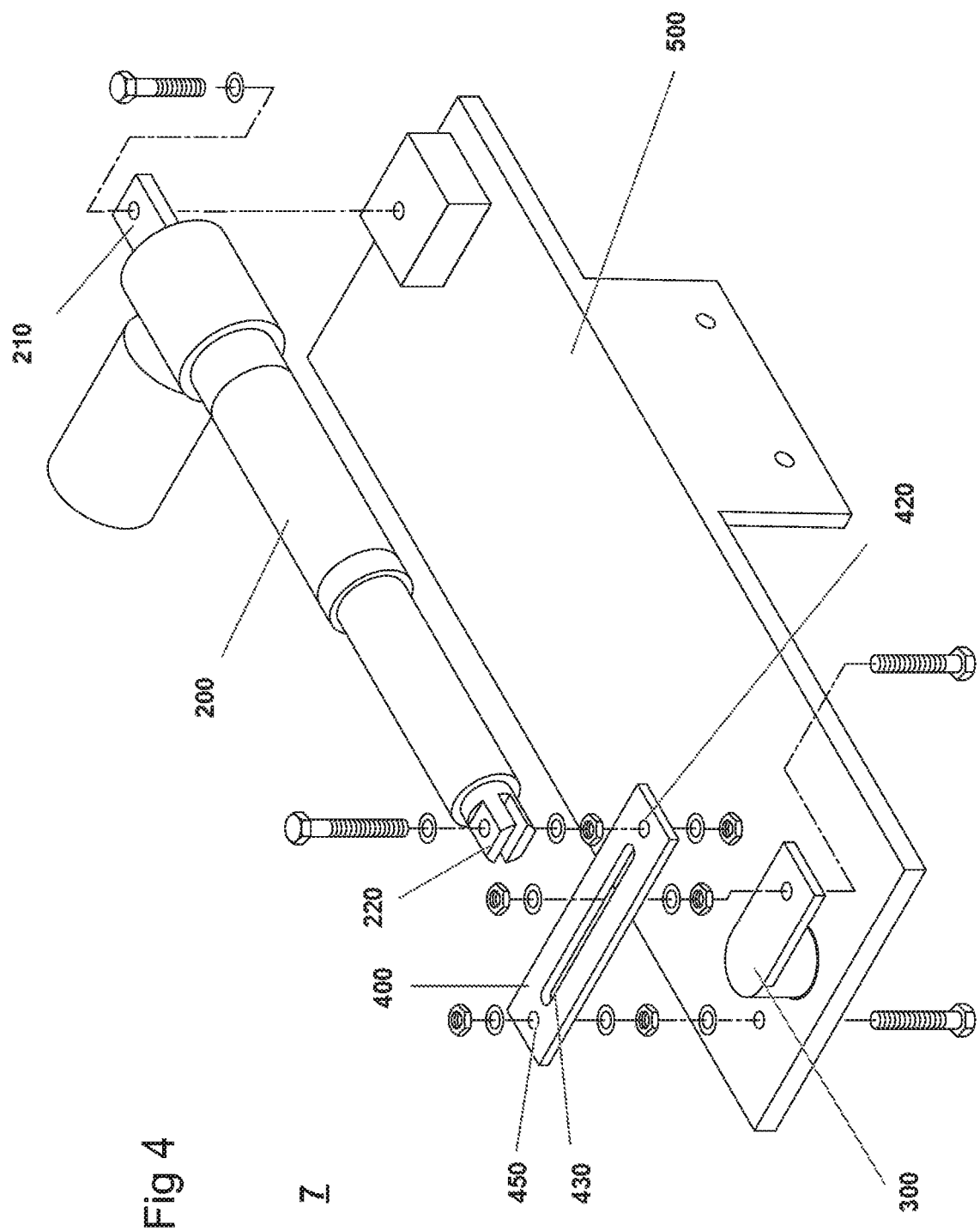
FIG. 4 is an exploded view of the linear actuator assembly of FIG. 2.
Figure 5:
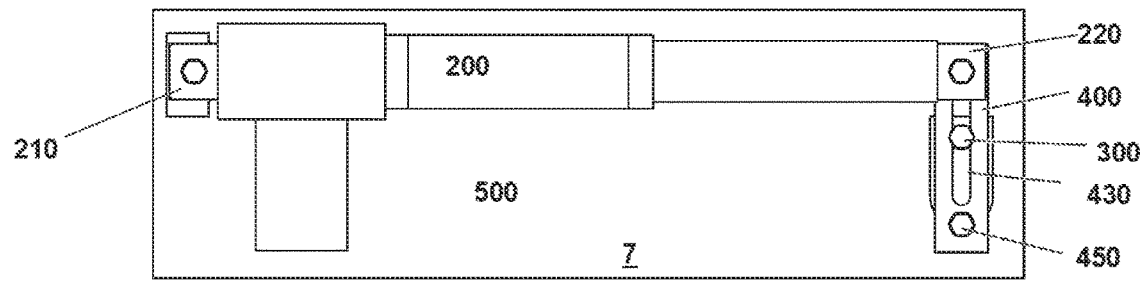
FIG. 5 is a view of the linear actuator assembly of FIG. 4 in a neutral configuration.

FIG. 4 is an exploded view of one embodiment of the linear actuator assembly 7. FIG. 5 is a view of linear actuator assembly 7 in a neutral configuration. The linear actuator assembly 7 comprises a linear actuator 200 having a first end 210 connected 250 to the primary boom 10 (not shown) via stand 500 and having a second end 220 extendable and retractable with respect to the first end 210 of the linear actuator 200 and operatively connected to the light array boom 100. The first end 210 of the linear actuator 200 may be rotatively connected 250 to the primary boom 10 to allow rotation of the first end 210 of the linear actuator 200 to enable linear to rotational motion. The linear actuator assembly 7 further comprises a slotted link 400 operatively connecting the linear actuator 200 to the light array boom 100. The slotted link has an anchor point 450 rotatively connected to the primary boom 10 (not shown) via stand 500. The slotted link also has a swivel point 420 rotatively connected to the second end 220 of the linear actuator 200. The slotted link 400 also has a slotted section 430 slidably and operatively connected to the light array boom 100. The linear actuator assembly 7 of further comprises a cam 300 operatively connecting the longitudinal axle 120 (not shown) of the light array boom 100 to the slotted section 430 of the slotted link 400.

Figure 6:
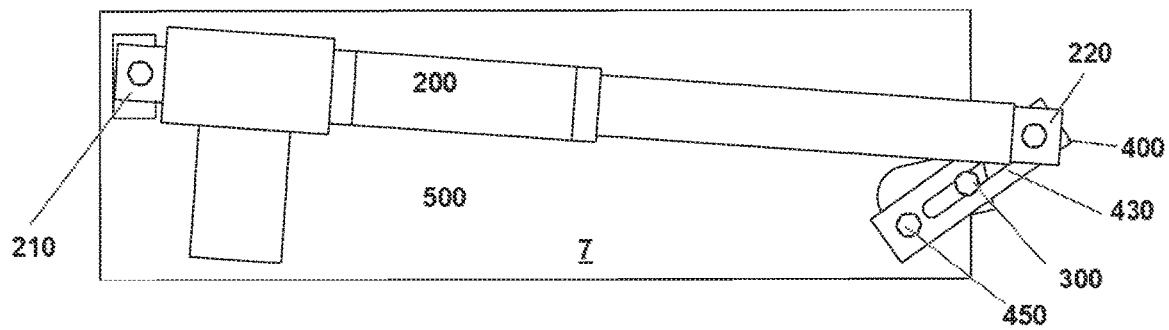
FIG. 6 is a view of the linear actuator assembly of FIG. 4 in an extended configuration.

FIG. 6 is a view of the linear actuator assembly 7 in an extended configuration. When linear actuator 200 extends, slotted link 400 rotates around the swivel point 420 and anchor point 450 in a first direction causing the slotted link 400 to rotate cam 300 and light array boom 100 in the first direction. The first end 210 of the linear actuator 200 rotates relative to the primary boom 10 thereby preventing binding on the slotted link 400 during extension.

Figure 7:
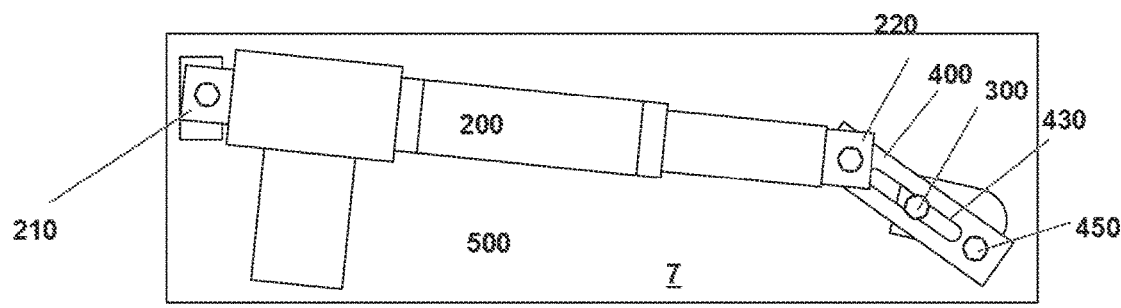
FIG. 7 is a view of the linear actuator assembly of FIG. 4 in a retracted configuration.

FIG. 7 is a view of the linear actuator assembly 7 in a retracted configuration. When linear actuator 200 retracts, slotted link 400 rotates around the swivel point 420 and the anchor point 450 in a second direction causing the slotted link 400 to rotate cam 300 and light array boom 100 in the second direction. The first end 210 of the linear actuator 200 rotates relative to the primary boom 10 thereby preventing binding on the slotted link 400 during retraction.

Figure 8:
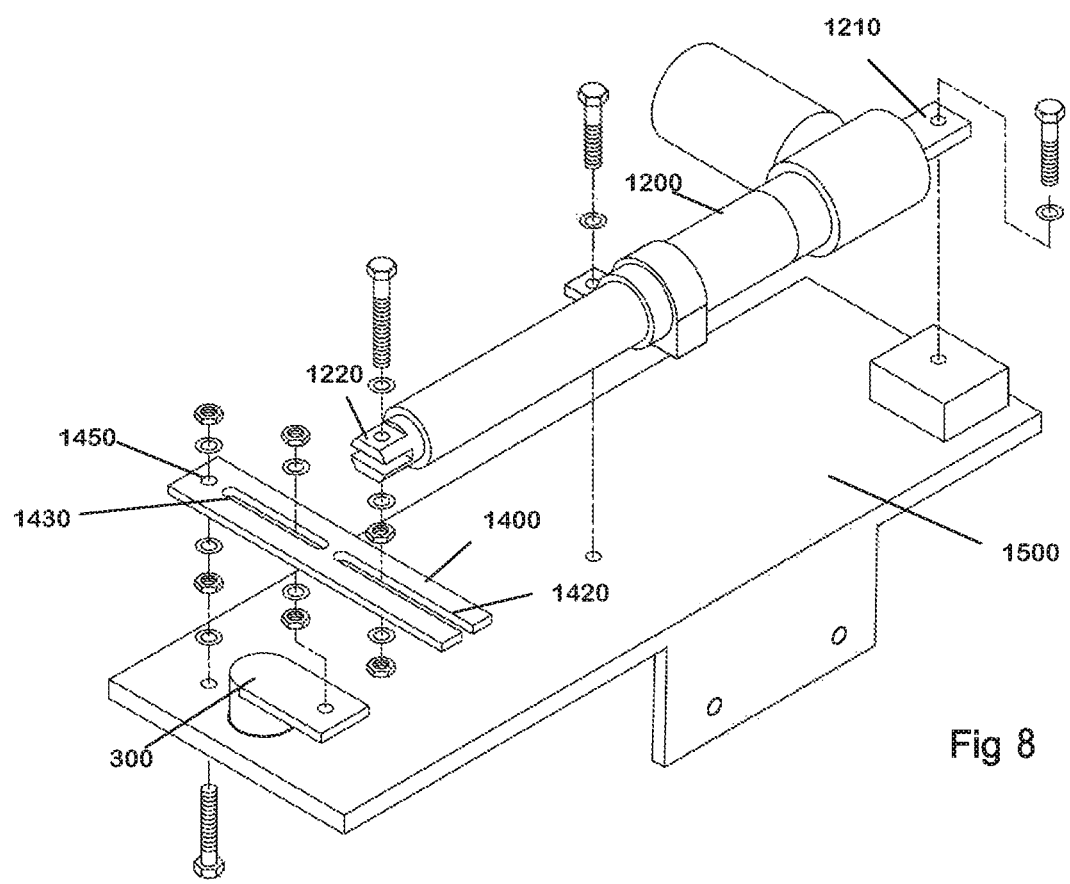
FIG. 8 is an exploded view of another embodiment of the linear actuator assembly.
Figure 9:
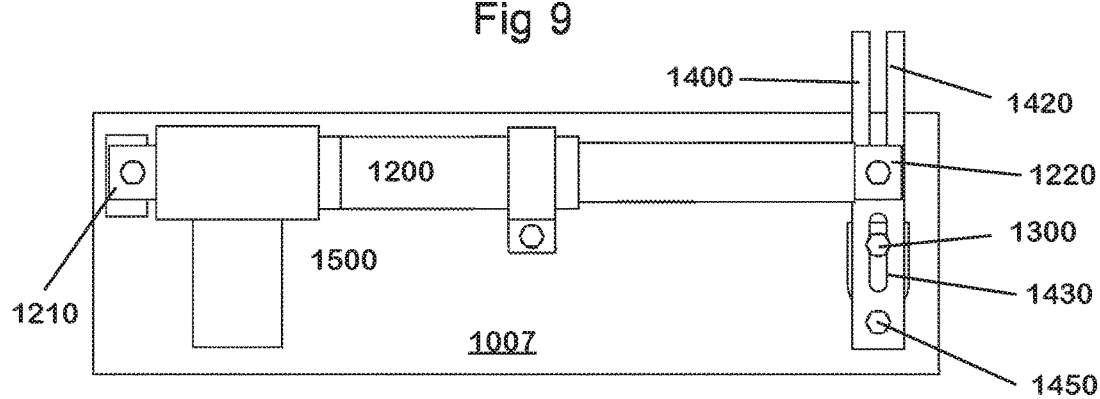
FIG. 9 is a view the linear actuator assembly of FIG. 8 in a neutral configuration.

FIG. 8 is an exploded view of one embodiment of the linear actuator assembly 1007. FIG. 9 is a view of linear actuator assembly 1007 in a neutral configuration. The linear actuator assembly 1007 comprises a linear actuator 1200 having a first end 1210 connected to the primary boom 10 (not shown) via stand 1500 and having a second end 1220 extendable and retractable with respect to the first end 1210 of the linear actuator 1200 and operatively connected to the light array boom 100. The linear actuator assembly 1007 further comprises a slotted 1400 link operatively connecting the linear actuator 1200 to the light array boom 100. The slotted link 1400 has an anchor point 1450 rotatively connected to the primary boom 10 (not shown) via stand 1500. The slotted link 1400 also has at least one slotted section 1420, 1430 slidably connected to the second end 1220 of the linear actuator 1200 and slidably and operatively connected to the light array boom 100. The linear actuator assembly 1007 of further comprises a cam 1300 operatively connecting the longitudinal axle 120 (not shown) of the light array boom 100 to the at least one slotted section 1420, 1430 of the slotted link 1400.

Figure 10:
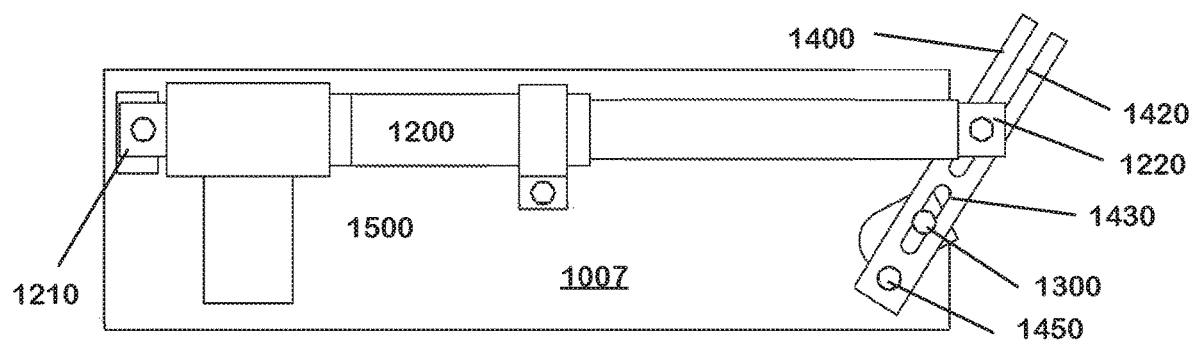
FIG. 10 is a view of the linear actuator assembly of FIG. 8 in an extended configuration.

FIG. 10 is a view of the linear actuator assembly 1007 in an extended configuration. When linear actuator 1200 extends, slotted link 1400 slides relative to the second end 1220 of the linear actuator 1200 and rotates around the anchor point 1450 and the second end 1220 of the linear actuator 1200 in a first direction causing the slotted link 1400 to rotate cam 1300 and light array boom 100 in the first direction.

Figure 11:
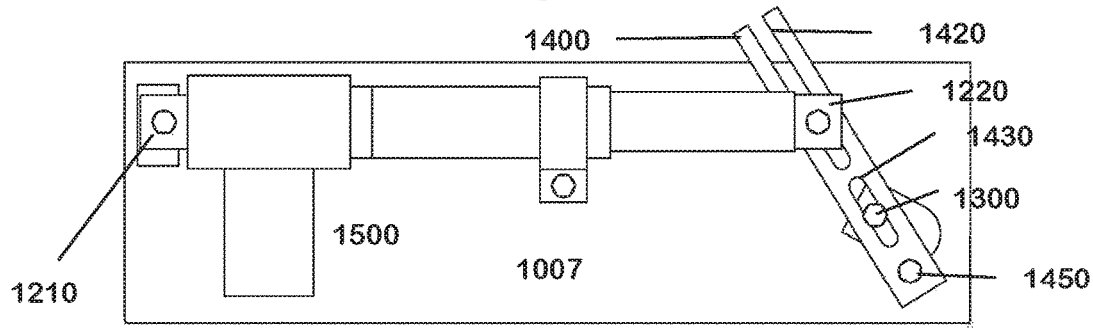
FIG. 11 is a view of the linear actuator assembly of FIG. 8 in a retracted configuration.

FIG. 11 is a view of the linear actuator assembly 1007 of FIG. 8 in a retracted configuration. When linear actuator 1200 retracts, slotted link 1400 slides relative to the second end 1220 of the linear actuator 1200 and rotates around the anchor point 1450 and the second end 1220 of the linear actuator 1200 in a second direction causing the slotted link 1400 to rotate cam 1300 and light array boom 100 in the second direction.

Figure 12:
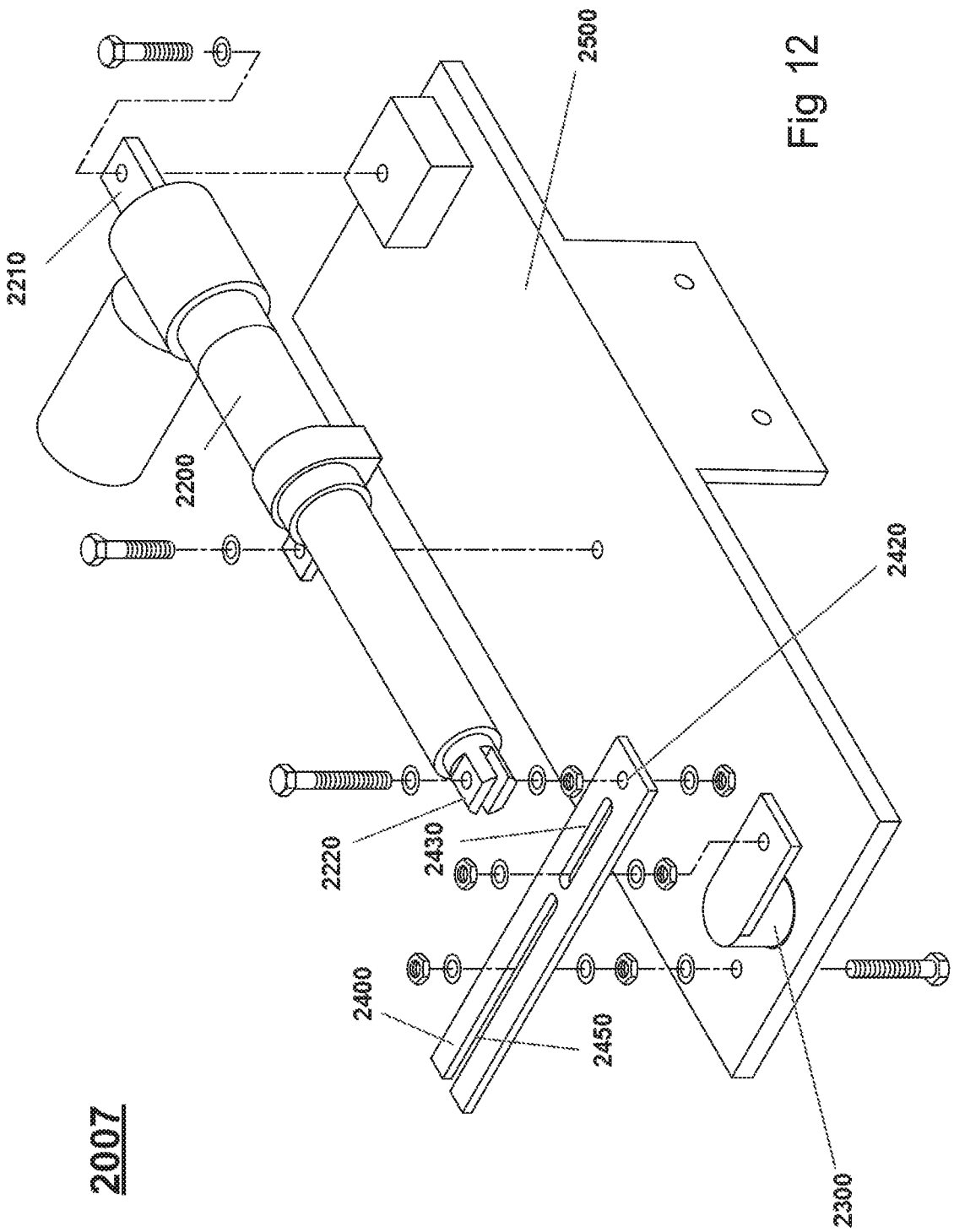
FIG. 12 is an exploded view of another embodiment of the linear actuator assembly.
Figure 13:
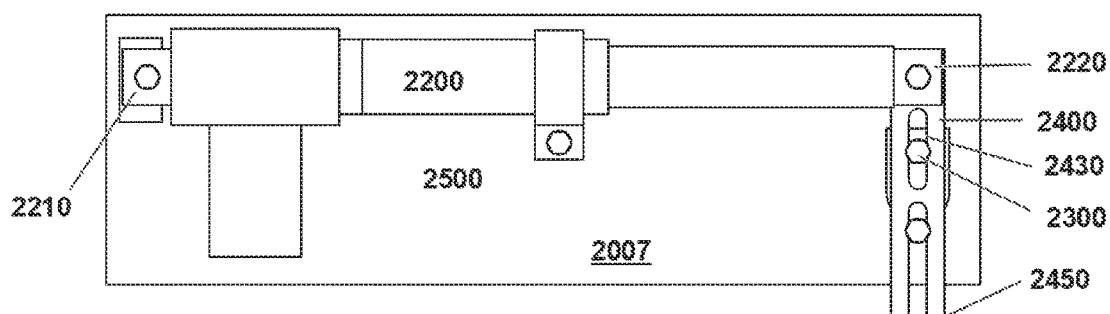
FIG. 13 is a view of the linear actuator assembly of FIG. 12 in a neutral configuration.

FIG. 12 is an exploded view of one embodiment of the linear actuator assembly 2007. FIG. 13 is a view of the linear actuator assembly 2007 in a neutral configuration. The linear actuator assembly 2007 comprises a linear actuator 2200 having a first end 2210 connected to the primary boom 10 (not shown) via stand 2500 and having a second end 2220 extendable and retractable with respect to the first end 2210 of the linear actuator 2200 and operatively connected to the light array boom 100. The linear actuator assembly 2007 further comprises a slotted link 2400 operatively connecting the linear actuator 2200 to the light array boom 100. The slotted link has a swivel point 2420 rotatively connected to the second end 2220 of the linear actuator 2200. The slotted link 2400 also has at least one slotted section 2430, 2450 slidably connected to the primary boom 10 (not shown) via stand 2500 and slidably and operatively connected to the light array boom 100. The linear actuator assembly 2007 further comprises a cam 2300 operatively connecting the longitudinal axle 120 (not shown) of the light array boom 100 to the at least one slotted section 2430, 2450 of the slotted link 2400.

Figure 14:
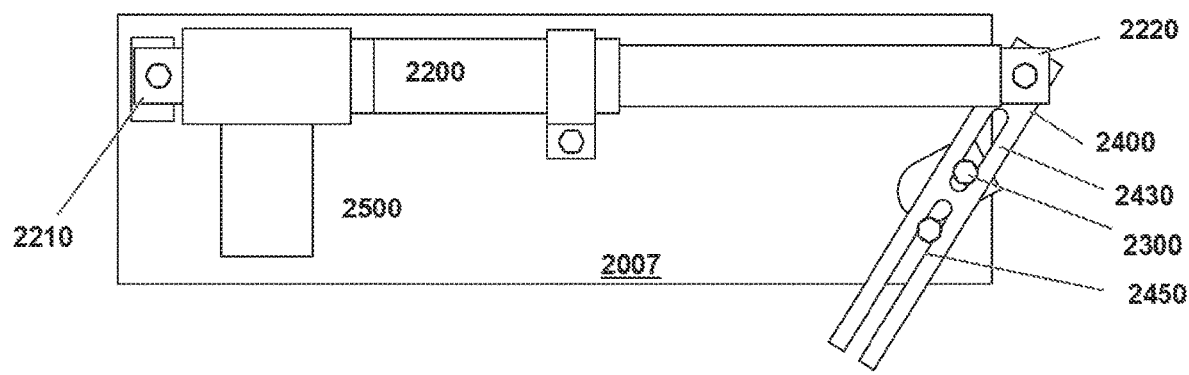
FIG. 14 is a view of the linear actuator assembly of FIG. 12 in an extended configuration.

FIG. 14 is a view of the linear actuator assembly 2007 in an extended configuration. When linear actuator 2200 extends, slotted link 2400 slides relative to the primary boom 10 and rotates relative to the swivel point 2420 and the primary boom 10 in a first direction causing slotted link 2400 to rotate cam 2300 and light array boom 100 in the first direction.

Figure 15:
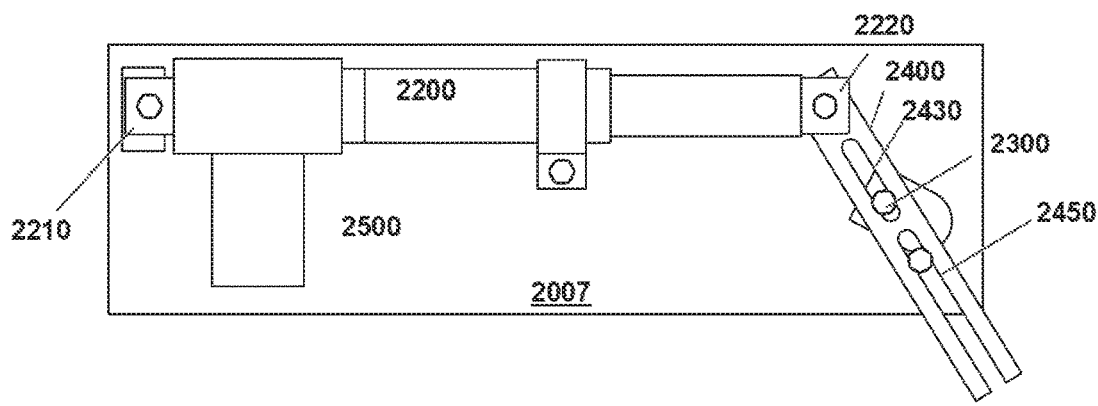
FIG. 15 is a view of the linear actuator assembly of FIG. 12 in a retracted configuration.

FIG. 15 is a view of the linear actuator assembly 2007 in a retracted configuration. When linear actuator 2200 retracts, slotted link 2400 slides relative to the primary boom 10 and rotates relative to the swivel point 2420 and the primary boom 10 in a second direction causing slotted link 2400 to rotate cam 2300 and light array boom 100 in the second direction.

Figure 16:
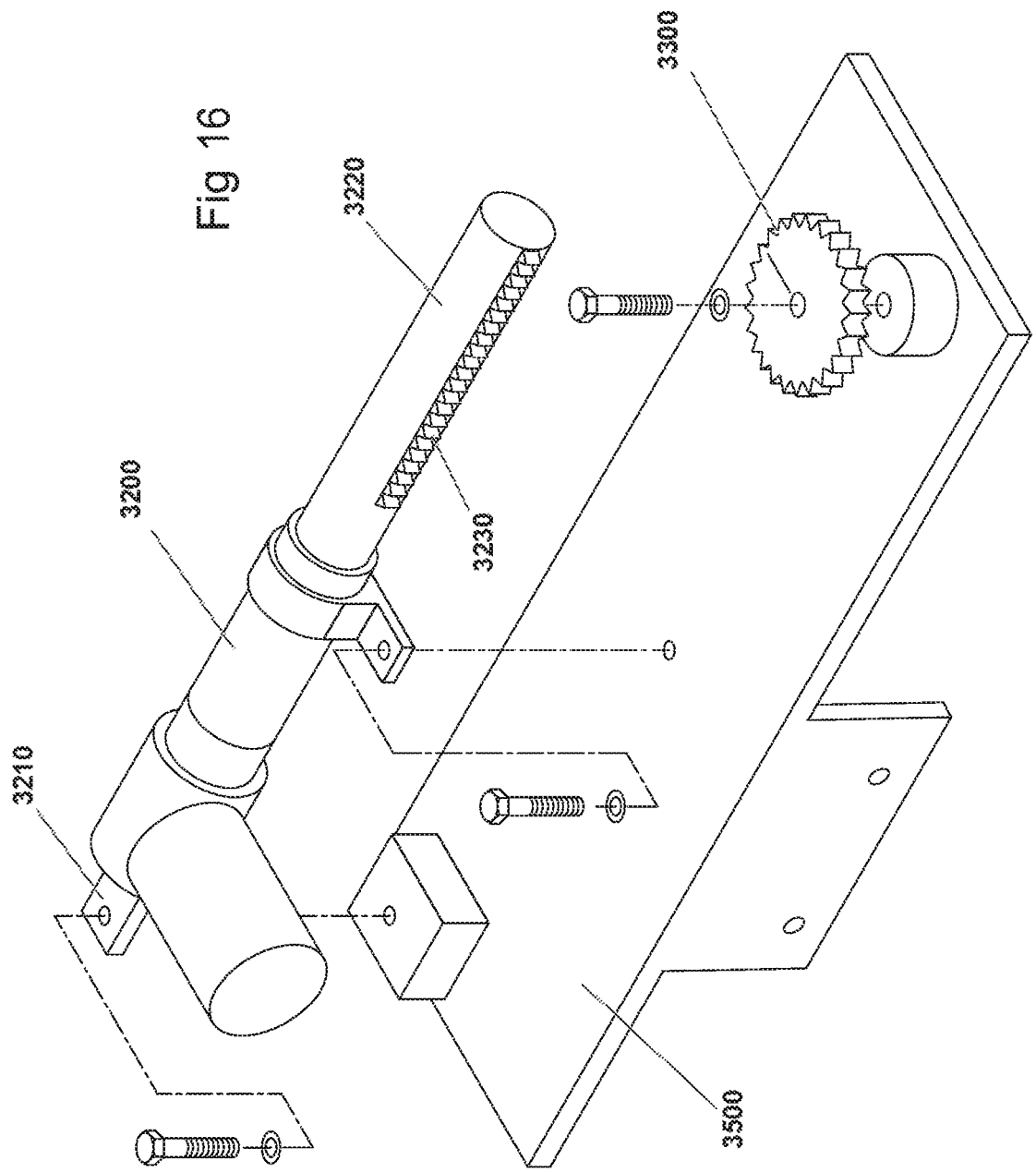
FIG. 16 is an exploded view of another embodiment of the linear actuator assembly.
Figure 17:
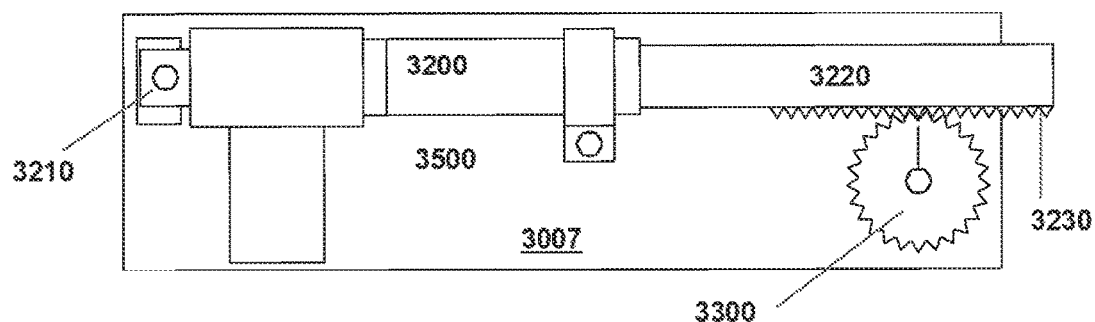
FIG. 17 is a view of the linear actuator assembly of FIG. 16 in a neutral configuration.
Figure 18:
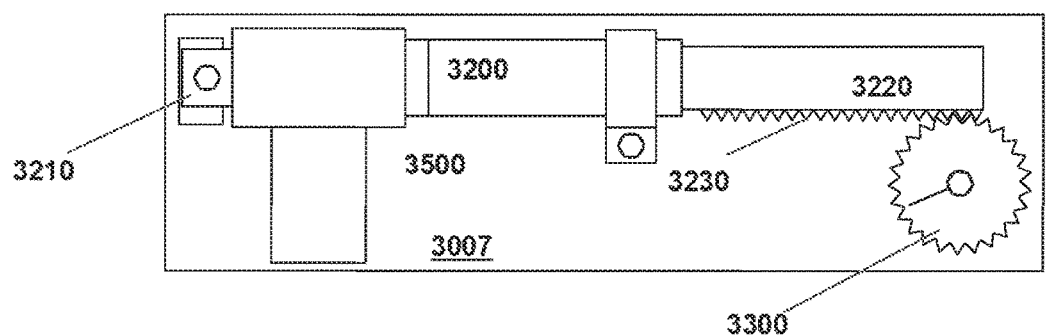
FIG. 18 is a view of the linear actuator assembly of FIG. 16 in an extended configuration.
Figure 19:
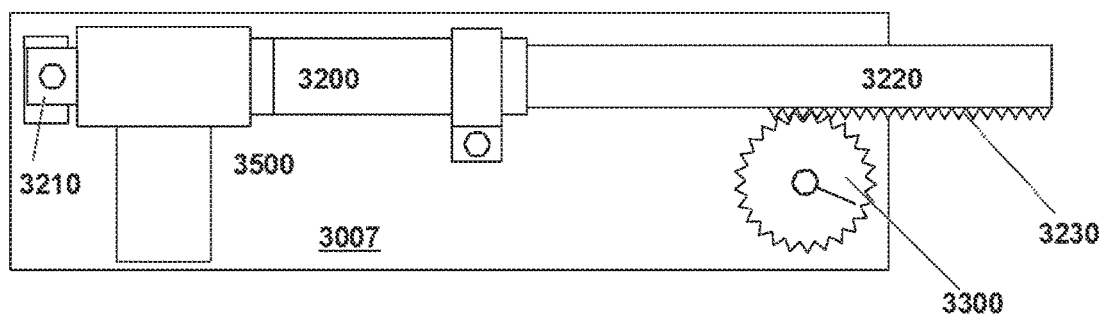
FIG. 19 is a view of the linear actuator assembly of FIG. 16 in a retracted configuration.

FIG. 16 is an exploded view of one embodiment of the linear actuator assembly 3007. FIG. 17 is a view of the linear actuator assembly 3007 in a neutral configuration. The linear actuator assembly 3007 comprises a linear actuator 3200 having a first end 3210 connected to the primary boom 10 (not shown) via stand 1500 and having a second end 3220 extendable and retractable on the first end 3210 of the linear actuator 3200 operatively connected to the light array boom 100. The second end 3220 of the linear actuator assembly 3007 further comprises a rack 3230 operatively connected to the light array boom 100. The linear actuator assembly 3007 further comprises a pinion 3300 operatively connecting the rack to the longitudinal axle 120 (not shown) of the light array boom 100.

FIG. 14 is a view of the linear actuator assembly 3007 in an extended configuration. When linear actuator 3200 extends, the rack 3230 rotates the pinion 3300 and the light array boom 100 in a first direction.

FIG. 15 is a view of the linear actuator assembly 3007 in a retracted configuration. When linear actuator 3200 retracts, the rack 3230 rotates the pinion 3300 and the light array boom 100 in a second direction.

In various embodiments, the linear actuator assembly 1007, 2007, 3007, 4007 includes a stand 500, 1500, 2500, 3500. In various embodiments, stand 500, 1500, 2500, 3500 connects 520, 1520, 2520, 3520 the first end of the linear actuator to the primary boom 10. In various embodiments, stand 500, 1500 rotatively connects 540, 1540 the anchor point 450, 1450 of the slotted link 400, 1400 to the primary boom 10. In various embodiments, stand 2500 slidably connects the slotted section 2450 of the slotted link 2400 to the primary boom 10. In various embodiments, longitudinal axle 120 passes through stand 500, 1500, 2500, 3500.

We claim:

1. A light tower assembly including:
   (a) a primary boom pivotally mounted to a base;
   (b) a light array rotatively mounted to said primary boom opposite the base wherein said light array rotates around an axis of rotation;
   (c) a mounting assembly rotatively mounting said light array to said primary boom;
   (d) a linear actuator assembly mounted to said primary boom and operatively connected to said light array to rotate said light array in one direction when said linear actuator assembly extends and configured to rotate said light array in an opposite direction when said linear actuator assembly retracts; and
   (e) a power assembly operatively connected to the linear actuator assembly to power said extension and retraction of said linear actuator assembly.

2. The apparatus of claim 1 wherein said mounting assembly comprises a first mounting plate connected to said primary boom, and a thrust washer positioned on said first mounting plate to rotatively support said light array around said axis of rotation.

3. The apparatus of claim 2 wherein said mounting assembly further comprising a second mounting plate connected to said primary boom and configured to stabilize said light array with respect to said primary boom.

4. The apparatus of claim 2 wherein said light array further comprises a longitudinal axle connected to the frame that is collinear with said axis of rotation of the light array, and extends through said thrust washer of said first mounting assembly.

5. The apparatus of claim 4 wherein said mounting assembly further comprises a flange bushing passing through a bore in said first mounting plate, said flange bushing configured to rotatively support the thrust washer and to stabilize the longitudinal axle with respect to the primary boom.

6. The apparatus of claim 5 wherein said mounting assembly further comprise a shaft collar configured to prevent said longitudinal axle from sliding relative to the first mounting plate.

7. The apparatus of claim 1 wherein said linear actuator assembly further comprises a stand connecting said linear actuator assembly to said primary boom.

8. The apparatus of claim 1 wherein said linear actuator assembly comprises a linear actuator having a first end connected to said primary boom, and a second end extendable and retractable with respect to said first end of said linear actuator, and operatively connected to said light array; a slotted link operatively connecting said linear actuator to the light array and having an anchor point rotatively connected to said primary boom, a swivel point rotatively connected to said second end of said linear actuator, and a slotted section slidably and operatively connected to said light array; and a cam operatively connecting said light array to said slotted link; wherein when said linear actuator extends, said slotted link rotates around said swivel point and anchor point in a first direction causing said slotted link to rotate said cam and said light array in said first direction; and wherein when said linear actuator retracts, said slotted link rotates around said anchor point in a second direction causing said slotted link to rotate said cam and said light array in said second direction, wherein said first end of said linear actuator rotates relative to said primary boom thereby preventing binding on said slotted link during extension and retraction.

9. The apparatus of claim 1 wherein the linear actuator assembly comprises a linear actuator having a first end connected to the primary boom, and a second end extendable and retractable on the first end of the linear actuator and operatively connected to the light array; a slotted link operatively connecting the linear actuator to the light array and having an anchor point rotatively connected to the primary boom, and at least one slotted section slidably connected to the second end of the linear actuator, and slidably and operatively connected to the light array; and a cam operatively connecting the light array to the slotted link;

wherein when linear actuator extends, slotted link slides relative to the second end of the linear actuator and rotates around the anchor point in a first direction, causing slotted link to rotate cam and light array in the first direction; and wherein when linear actuator retracts, slotted link slides relative to the second end of the linear actuator and rotates around the anchor point in a second direction causing slotted link to rotate cam and light array in the second direction.

10. The apparatus of claim 1 wherein the linear actuator assembly comprises a linear actuator having a first end connected to the primary boom, and a second end extendable and retractable on the first end of the linear actuator and operatively connected to the light array; a slotted link operatively connecting the linear actuator to the light array and having a swivel point rotatively connected to the second end of the linear actuator, and at least one slotted section slidably connected to the primary boom, and slidably and operatively connected to the light array; and a cam operatively connecting the light array to the slotted link; wherein when linear actuator extends, slotted link rotates relative to the swivel point and slides relative to the primary boom in a first direction causing slotted link to rotate cam and light array in the first direction; and wherein when linear actuator retracts, slotted link slides and rotates relative to the anchor point connected to the primary boom in a second direction causing slotted link to rotate cam and light array in the second direction.

11. The apparatus of claim 1 wherein the linear actuator assembly comprises a linear actuator having a first end connected to the primary boom, and a second end extendable and retractable on the first end of the linear actuator and having a rack operatively connected to the light array; and a pinion operatively connecting the rack to the light array boom wherein when linear actuator extends, the Rack rotates the pinion and the light array in a first direction; and wherein when linear actuator retracts, the rack rotates the pinion and the light array in a second direction.

12. The apparatus of claim 1 wherein said primary boom is connected to a base boom, wherein said base boom is connected to said base, and said primary boom may be raised relative to said base boom.

13. The apparatus of claim 1 wherein said primary boom is pivotally connected to said base and configured to have an operating position extending vertically from said base, and a storage position substantially perpendicular to said operating position.

14. The apparatus of claim 1 wherein said base is a portable frame.

15. The apparatus of claim 1 further including:
(a) a tower post pivotally mounting the primary boom to the base;
(b) a pivot controller affixed to the base and operatively attached to the primary boom, the pivot controller when activated causing the primary boom to be raised to a vertical position;
(c) a safety means to control the movement of the primary boom as it is pivoted into a vertical position;
(d) an extension boom extendably and retractably connecting the primary boom to the base; and
(e) a telescoping controller affixed to the base and operatively attached to the extension boom, the telescoping controller when activated causes the extension boom to extend the primary boom relative to the base.

16. A tower array assembly including:
(a) a primary boom pivotally mounted to a base;
(b) an array mounted on to said primary boom wherein said array rotates around an axis of rotation; and
(c) a linear actuator mounted to said primary boom and operatively configured to rotate said array boom in one direction when said linear actuator extends and operatively configured to rotate said array boom in an opposite direction when said linear actuator retracts.

17. A light tower assembly including:
(a) a primary boom having a first and second end, the first end secured to a base;
(b) a light array having an axis, wherein said light array is rotativity mounted to the second end of the primary boom;
(c) a mounting assembly mounting the axis to the second end of the primary boom such that the axis is substantially vertical and the light assembly rotates across a plane of rotation that is substantially horizontal;
(d) a linear actuator mounted to said primary boom and operatively configured to rotate said light array in one direction across the substantially horizontal plane of rotation when said linear actuator extends and operatively configured to rotate said light array in an opposite direction across the substantially horizontal plane of rotation when said linear actuator retracts; and
(e) a power assembly operatively connected to the linear actuator and light array to power said extension and retraction of said linear actuator and to power said light array.

* * * * *